United States Patent [19]
Cloutier et al.

[11] Patent Number: 5,847,771
[45] Date of Patent: Dec. 8, 1998

[54] DIGITAL ENTERTAINMENT TERMINAL PROVIDING MULTIPLE DIGITAL PICTURES

[75] Inventors: Leo Cloutier, Bethesda, Md.; Paul Brewer, Arlington, Va.

[73] Assignee: Bell Atlantic Network Services, Inc., Arlington, Va.

[21] Appl. No.: 698,281

[22] Filed: Aug. 14, 1996

[51] Int. Cl.⁶ .............................. H04N 5/445; H04N 5/45
[52] U.S. Cl. .......................... 348/564; 348/565; 348/567; 348/568; 348/588
[58] Field of Search ..................................... 348/564, 565, 348/567, 568, 588, 598; 382/240; H04N 5/445, 5/45

[56] References Cited

U.S. PATENT DOCUMENTS 5,481,315  1/1996  Matsunaga .............................. 348/565

Primary Examiner—Sherrie Hsia
Attorney, Agent, or Firm—McDermott, Will & Emery

[57] ABSTRACT

Two MPEG-encoded digital data streams are simultaneously decoded in a digital entertainment terminal to provide Picture-in-Picture (PIP) and Picture-on-Picture (POP) capabilities for a conventional television. A primary MPEG-encoded data stream is decoded using a digital video processor optimized for MPEG2 decoding or a dedicated MPEG2 decoder system. A secondary MPEG-encoded data stream is partially processed by filtering the B frames of the secondary MPEG-encoded data stream and using the corresponding I and P frames in a partial decoding arrangement to obtain decompressed video data providing a limited-resolution representation of a second program. Partial decoding may also be performed using only I frames. The partial decoding may be implemented through execution of software by a general-purpose microprocessor. Alternatively, the media processor may perform the partial decoding during the idle intervals of the dedicated media processor.

48 Claims, 8 Drawing Sheets

5,847,771

DIGITAL ENTERTAINMENT TERMINAL PROVIDING MULTIPLE DIGITAL PICTURES

TECHNICAL FIELD

The present invention relates to a programmable digital entertainment terminal (DET) for use in digital video program distribution networks and to systems and methods for providing picture-in-picture and picture-on-picture capabilities in digital video systems.

BACKGROUND ART

Conventional televisions may contain special circuitry to perform picture-in-picture (PIP), where two programs are viewed simultaneously. A picture-in-picture feature generally provides a small image of the picture or video portion of a secondary program signal inset within the display of a normal primary video program. Picture-on-picture (POP) images use similar techniques to provide images that have a secondary program signal positioned beside a main picture rather than overlying the main picture.

Implementation of PIP or POP in a digital video network feature requires processing of two digital image signals, one for the primary program selection and a second for the picture-in-picture inset. In digital video networks, presentation of selected video programs via an analog television set requires a digital decoder, often referred to as a digital set-top box or digital entertainment terminal. The digital set-top box includes dedicated digital signal processing circuitry for decoding the digital video signals from the network. For example, a set-top box for reception of MPEG encoded digital video signals typically includes a digital demultiplexer, an MPEG video decoder, an MPEG audio decoder and circuits for converting decompressed digital video and audio streams from the decoders into analog signals for driving a television receiver. Since implementation of PIP in digital networks requires processing of two digital signals, two set-top boxes each having MPEG decoders may be needed to process the two digital signals. However, such an approach results in significant cost to the consumer.

U.S. Pat. No. 5,469,206 to Strubbe et al. discloses a system that receives compressed audio/video programming from a digital transmission system and having, for example, MPEG and MUSICAM formats. FIG. 1 of Strubbe et al. discloses a system having a first RF decoder 10 in a VCR and a second RF decoder 15 in a television receiver. As shown in FIG. 2 of Strubbe et al., the RF decoders 10 and 15 each include a decompressor 8 that decompresses the program data to provide audio and video television programming. The decoded signals are output from the respective RF decoders to a picture-in-picture (PIP) circuit 30 that outputs the two program sources in a PIP format to a display 25. Hence, two decoders are still needed for PIP processing, one in the VCR and the second in the television receiver, requiring extensive modification or purchases by the consumer of new VCR's and televisions.

U.S. Pat. No. 5,361,098 to Lucas discloses a system for producing a reduced-size (mean-only) image within a full-size image for a picture-in-picture inset from compressed digital data. FIG. 2 shows a mean-only decode section 20 including a demultiplexer 22 that separates out Y, U, V mean value components from a compressed video stream, and decoders 24A, 24B and 24C that reconstruct the Huffman-encoded luminance and chrominance data from the respective Y, U, V mean value components. The mean-only decode section 20 also includes circuitry 26 that creates a $\frac{1}{16}$ size means-only image from the reconstructed data. Thus, Lucas still requires the additional circuitry of the mean-only decode section 20 to provide PIP capabilities from compressed, digital data.

Hence, implementation of PIP or POP as a digital video network feature has required modification of existing set-top devices to add extra decoders to provide the necessary processing of the second digital signal for the picture-in-picture inset. Alternately, implementation has required modifications to the televisions or VCRs to simultaneously process two or more digital video signals.

DISCLOSURE OF THE INVENTION

There is a need for an arrangement (apparatus and method) for implementing Picture-in-Picture (PIP) and Picture-on-Picture (POP) capabilities for digital video systems.

There is also a need for an arrangement for adding PIP and POP capabilities to a digital entertainment terminal without any hardware modifications to the digital entertainment terminal or to a conventional television.

There is also a need for an apparatus having an MPEG decoder capable of processing two digital video data streams of MPEG-encoded data for PIP and POP processing.

According to one aspect of the present invention, an apparatus includes a digital video processor decompressing a first stream of compressed, digital data representing a first video program into decompressed first video data having a first resolution. An application processor partially decompresses a second stream of compressed, digital data representing a second video program into decompressed second video data having a second resolution less than the first resolution. The digital video processor also outputs a video signal representing a frame of the first video data having a portion overlaid by the decompressed second video data.

In a preferred implementation of this apparatus, the application processor is a general purpose processor and is capable of executing different software or firmware applications in conjunction with the partial decompressing of the second stream. Hence, the apparatus of the present invention can be easily implemented within an existing digital entertainment terminal having a microprocessor without any hardware modifications, for example by merely loading software having the routine for partially decompressing into memory accessible by the microprocessor.

Another aspect of the present invention provides a method of generating a video signal of first and second video programs, including the steps of receiving first and second MPEG-encoded streams carrying the first and second video programs, respectively. The first MPEG-encoded stream is decoded in an MPEG decoder and outputting as decompressed, first digital data carrying the first video program. The method also includes partially decoding the second MPEG-encoded stream and generating second digital data carrying a limited-resolution representation of the second video program, combining the first and second digital data in a video memory, and outputting from the video memory a video signal carrying a frame of the combined data. The partial decoding of the second MPEG-encoded stream enables the first and second video programs to be displayed from the single video signal without the need for an additional decoder.

Still another aspect of the present invention provides a digital entertainment terminal comprising an application processor receiving multiplexed digital data carrying first and second streams of compressed, digital data representing first and second programs, respectively. The first and second streams have first and second identifiers, respectively, and the application processor outputs the first stream of compressed digital data and a portion of the second stream of compressed, digital data in response to the respective first and second identifiers. The digital entertainment terminal also includes a digital video processor decompressing at least the first stream into first decompressed video data representing the first program. The digital video processor combines the first decompressed video data with second decompressed video data generated from the portion of the second stream and outputs the combined first and second video data as a video signal representing a video frame simultaneously displaying at least portions of said first and second video programs. According to this aspect of the present invention, the portion of the second stream is partially decompressed into the second decompressed video data by one of the application processor and the digital video processor. Hence, the digital video processor may process both first and second decompressed video data by partially decompressing the portion of the second stream. Alternately, the application processor may execute software to partially decompress the portion of the second stream.

According to another aspect of the present invention, an apparatus comprises an MPEG decoder. This decoder decompresses a first stream of compressed, digital data into first video data having a first resolution. The decoder also partially decompresses a second stream of compressed, digital data into second video data having a second resolution less than the first resolution. The first and second video data represent first and second video programs, respectively. An overlay controller receives the first and second video data, and in response outputs a video frame signal simultaneously displaying at least portions of the first and second video programs. Hence, the apparatus uses a single MPEG decoder to obtain first and second video data representing first and second video programs, respectively, and an overlay controller to simultaneously display at least portions of the first and second video programs. The MPEG decoder performs the partial decompression of the second stream during idle intervals between frames from the first stream of compressed, digital data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

According to the present invention, the dedicated decoder circuitry in the digital entertainment terminal (DET) will fully decompress one video stream for the primary picture, in the normal manner. An additional decoder arrangement, described below, will decode a portion of the video stream data of a selected secondary program, for use as the video inset for picture-in-picture. In one embodiment of the invention, the general purpose microprocessor controlling the digital entertainment terminal will run a partial or reduced-set decoding application to decode the limited portion of the secondary video signal. In another embodiment, idle intervals that occur in the dedicated decoder circuitry between processing frames of the primary compressed data stream are used to partially process the limited portion of the secondary video signal. Hence, no additional hardware is necessary to execute the picture-in-picture (PIP) feature in existing digital entertainment terminals, and implementation of the PIP feature requires only downloading of an appropriate decoder application into the DET.

A high-level description will first be provided of an exemplary digital video network supplying the primary and secondary compressed data streams, followed by a detailed description of the customer premises equipment including the DET performing the PIP processing.

Figure 1:
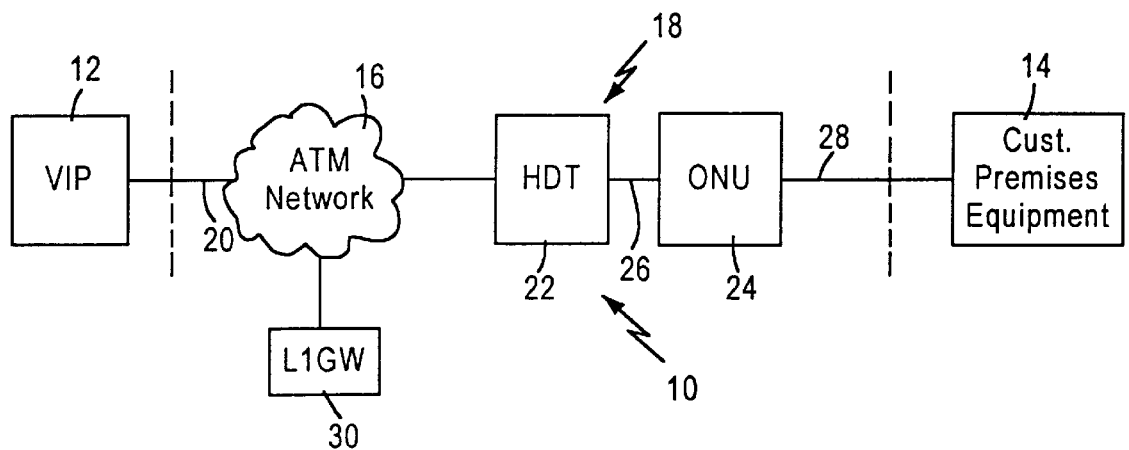
FIG. 1 is a block diagram of a digital video network supplying multiplexed steams of compressed, digital data to a customer premises.

FIG. 1 is a block diagram of a digital video network 10 supplying multiplexed steams of compressed, digital data from a video information provider (VIP) 12 to customer premises equipment 14. The network 10 provides transport for broadband services including broadcast video and IMTV type services, such as video on demand. The network 10 also provides interactive text services and voice telephone services. In addition, the network downloads software to the DET, including software for performing PIP processing by partially decompressing a secondary compressed data stream. A more detailed description of one implementation of the network 10 and the downloading of software to the DET is disclosed in commonly-assigned, copending application No. 08/498,265, filed Jul. 3, 1995, U.S. Pat. No. 5,666,293, entitled DOWNLOADING OPERATING SYSTEM SOFTWARE THROUGH A BROADCAST CHANNEL (attorney docket 680-083D), the disclosure of which is incorporated in its entirety by reference.

The illustrated network 10 comprises an ATM backbone network 16 and a local loop network 18. The ATM backbone network 16 includes optical fibers 20 that transport ATM cell streams from the VIP 12 to an ATM edge device (not shown). ATM cell streams output from the VIP 12 may carry broadcast programming as compressed, digital data such as MPEG-encoded data. Alternately, the ATM cell streams may carry software programming to be downloaded to the customer premises equipment 14.

The local loop network includes host digital terminals (HDT's) 22, optical network units (ONU) 24, two-way optical fiber pairs 26 coupling the HDT's 22 and optical network units 24, and coaxial cables 28 and/or twisted wire pairs connecting the ONU 24 to the subscriber premises equipment 14. Broadcast services are controlled by control processor elements (not shown) within the HDT's 22 and a video administration module (not shown). ATM cell streams carrying broadcast programming are distributed throughout the ATM network 16 to a large number of the host digital terminals (HDT's) 22.

Signaling communications takes place between the customer premises equipment 14 and the serving HDT 22. The upstream signaling communications enables a user to order a specific service from the VIP 12, for example request pay-per-view or IMTV services.

The ATM network 16 includes at least one ATM switch (not shown) for interactive multimedia television (IMTV) services. A subscriber wishing to initiate an IMTV session interacts with a level 1 gateway 30 which in turn communicates with a PVC controller (not shown) to obtain the requisite bandwidth through the ATM switch.

Although only one VIP 12 is shown in FIG. 1, a plurality of VIPs and service information providers providing video, text, software, etc., may be connected to the network 10. According to the disclosed embodiment, the ONU 24 supplies an ATM cell stream specified by the HDT 22 to the customer premises equipment 14 at 51.84 MBits/s according to a CAP-16 physical layer protocol. This bit stream contains ATM cell streams (virtual channels) for a number of selected programs, e.g., to provide service to several terminals or two or more program signals to one terminal for PIP processing.

Figure 3:
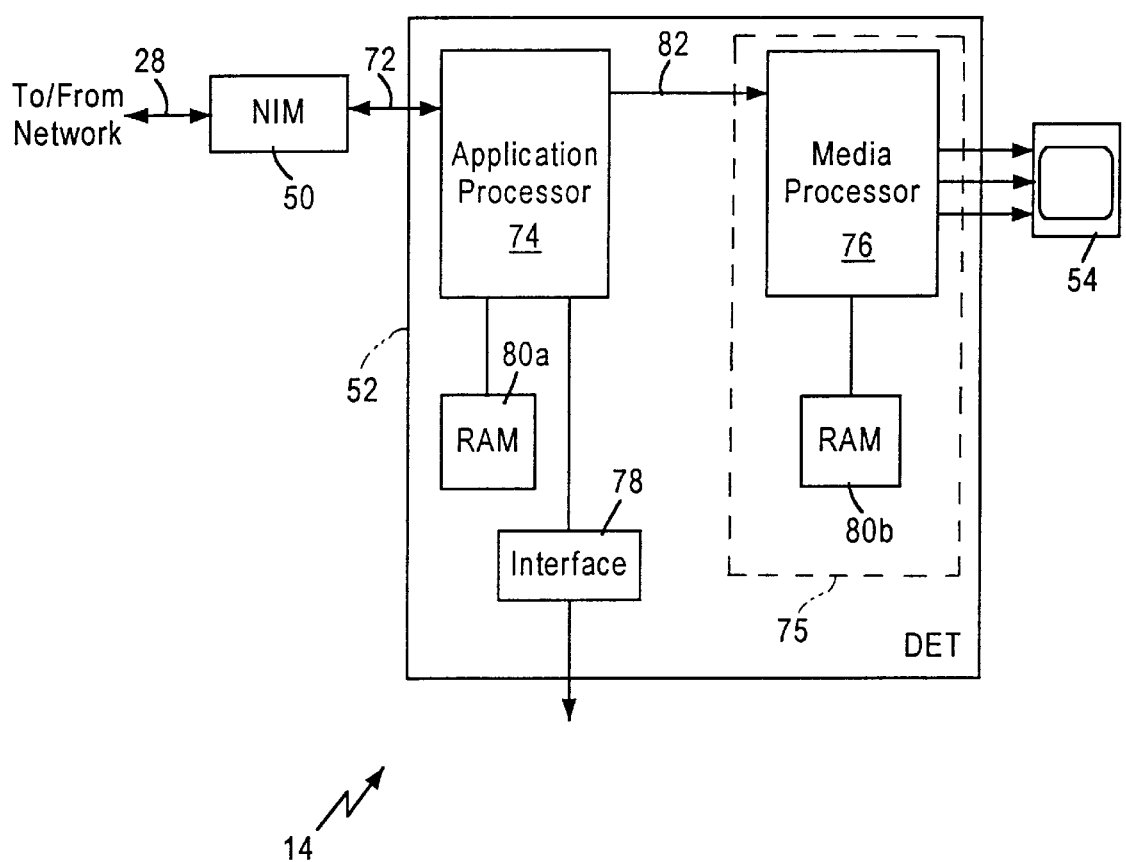
FIG. 3 is a block diagram of the customer premises equipment in the network of FIG. 1 including the digital entertainment terminal according to one embodiment of the present invention.

In normal operation, the broadcast network supplies at least a selected program channel to the customer premises equipment 14 including a network interface module (NIM) 50 and a digital entertainment terminal (DET) 52, shown in FIG. 3. The NIM 50 and the DET 52 are collectively referred to as the set-top box or set-top terminal. The set-top terminal processes information from the selected channel to produce signals capable of presenting information from that channel to a user in humanly perceptible form, e.g. to drive a standard television set 54 to display selected video programming. The NIM provides the actual physical connection to the network and the transport protocol processing (e.g. ATM). The DET 52 performs the actual decoding to produce the output signals from the information. The DET 52 also includes the primary intelligent control processor for overall control of the operation of the DET.

Since the network 10 utilizes ATM transport, the VIP 12 operates a system 12 including an encoder system. The encoder includes an ATM multiplexer (mux) (not shown) and a video encoder that supplies MPEG2 encoded packets of video program data. The VIP's system also includes a data module that receives a repeating or cyclical sequence of one or more data files from a data server. The data files may be configuration data or software executable by the DET, for example PIP processing software. The data module compresses the data files using MPEG2 compression, and supplies a repeating sequence of MPEG2 packets to the ATM multiplexer. Hence, ATM cell streams transported by the ATM network 16 may carry a plurality of video program data or executable software.

Figure 2:
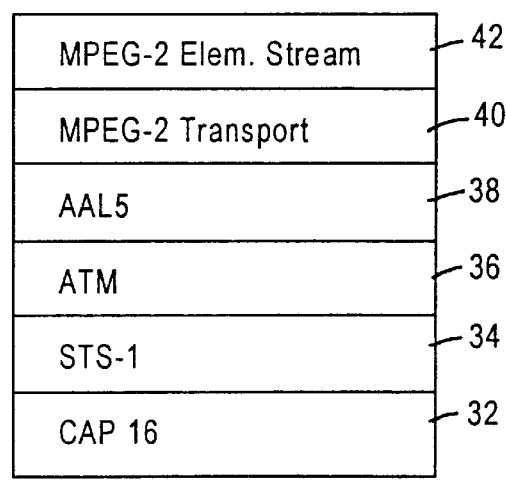
FIG. 2 is a diagram illustrating the transport layer protocol of the compressed, digital data from the digital video network of FIG. 1.

FIG. 2 is diagram showing the protocol structure for the data supplied to the customer premises equipment 14 according to the Open Systems Interconnection (OSI) Reference Model. The CAP 16 layer is the physical layer between the ONU 24 and the customer premises equipment 14. The CAP 16 layer 32 uses CAP 16 modulation and forward error correction, and occupies bandwidth below 30 MHz, with approximately 2 MHz of bandwidth reserved for upstream signaling from the customer premises equipment 14. A transmission convergence protocol 34 using STS-1 protocol is used as the data link layer above the physical layer 32. The next layer in the protocol structure is the ATM transport layer 36, including the ATM headers and payloads, then the AAL5 layer 38, described below.

The MPEG2 transport layer 40 includes MPEG2 program transport streams corresponding to a specified Program Identifier (PID) value and having a Program Clock Reference (PCR) value. The transport layer 40 may include a plurality of MPEG2 streams, including video, audio, text, etc. for a specified program. The MPEG2 elementary stream specifies an individual packetized elementary stream (PES) of MPEG2 compressed data, for example a video frame, audio data, or executable software data.

Hence, FIG. 2 illustrates the encoding, compression, and encapsulation of data at the VIP headend before transmission on the network 10, and the corresponding assembling and decompression at the customer premises equipment 14.

In ATM, transfer is asynchronous in the sense that the recurrence of cells that contain information from any particular sender is not necessarily periodic. Each device 12, 30 using an ATM network 16 submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more bandwidth is needed.

In ATM, information is organized into cells having a fixed length and format. Each cell includes a header, primarily for identifying cells relating to the same virtual connection, and an information field or "payload". Under presently existing ATM standards, a 53 byte ATM cell includes a cell header consisting of 5 bytes and a payload consisting of 48 bytes of payload data. The ATM cell header information includes a virtual path identifier (VPI) and a virtual circuit identifier (VCI) to identify the particular communication to which each cell relates. The specific format of the ATM cell is described, for example, in the ATM User Network Interface Specification, Version 3.0, published by The ATM Forum, Mountain View, Cali., also published by Prentice Hall, the disclosure of which is incorporated in its entirety by reference.

The typical ATM cell format in layer 36 of FIG. 2 includes a header section and a payload section. The first 8-bit byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes the last four bits of the VCI; a 3-bit payload type indicator (PT); and a cell loss priority bit (CLP). The fifth byte of the header section includes an 8-bit header error check (HEC) word. Bytes 6 to 53 carry information and form the ATM cell payload section.

The ATM multiplexer at the system operated by VIP 12 performs an ATM adaptation function which converts the MPEG2 transport packets of layer 40 into ATM cells. The ATM multiplexer also performs a multiplexing function to combine cells streams carrying payload data from a number of sources into one higher rate bit stream.

In ATM based networks of the type under consideration here, the MPEG2 bit streams are converted into cellular payload data, and cell headers are added. A number of techniques can be used to adapt the transport packets into ATM cells, and certain preferred techniques are described below by way of example.

Each MPEG packet consists of 188 bytes, whereas each ATM cell includes 48 bytes of payload data. The ATM multiplexer which map the MPEG packets into ATM cells preferably uses two different adaptations to encapsulate MPEG2 packets in ATM cells. The first adaptation maps one 188 byte MPEG packet into five ATM 48-byte cell payloads, shown as layer 38. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder at the customer premises, the packets carrying the PCR values need to be encoded and transported quickly. To avoid delaying first packets containing a PCR while processing a second packet, the present system maps first packets containing a PCR immediately, using the five cell adaptation procedure. In a typical video transmission, the PCR is present in approximately 10 out of every 4000 MPEG2 packets. Also, at least some of those 10 packets will arrive as the second packet of a pair. Consequently, only a very small number of packets are mapped using the less efficient 5-cell adaptation. In addition, it is possible for some systems to map two MPEG2 transport packets into 8 cells in all cases regardless of whether a PCR is contained in the first of the two packets.

The MPEG real time encoder in the system operated by VIP 12 supplies a stream of MPEG2 packets to the ATM multiplexer. The ATM multiplexer checks the flags in the adaption field (if any) in the first packet to determine if that packet includes a program clock reference (PCR) value. The ATM multiplexer applies the 5 cell adaptation to first packets containing a program clock reference (PCR) value. The ATM multiplexer applies the 8 cell adaptation to pairs of cells wherein the first packet does not contain a program clock reference (PCR) value. Packets containing private data, such as applications and operating system software, will not contain a PRC flag.

For each type of adaptation, the ATM multiplexer will first convert the source packet or pair of packets into a single ATM adaptation layer 5 (AAL5) packet of layer 38. As part of this conversion, the mux will add an AA15 trailer, either at the end of the single packet or at the end of the pair of packets. The actual trailer consists of 8 bytes of data, including 4 bytes of cyclic redundancy check (CRC) data, user information (e.g. length), etc.

For a 5 cell adaptation, the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The ATM mux breaks the AAL5 packet (240 bytes) down into five 48-byte payloads (SAR-PDU) and attaches appropriate 5 byte headers to each payload to thereby form five 53-byte ATM cells in layer 36.

The header of all five of the ATM cells will contain the VPI/VCI value assigned to the particular communication. For example, for the broadcast service combined with the software downloading, the assigned VPI and VCI value would correspond to network logical channel 0. For the video and audio portion of the program guide service, the packets would periodically contain a PCR value and periodically would go through the 5 cell adaptation in the normal manner. The header of the first of the five cells also has a bit designated "AAU" which has a value of "0" to identify that cell as the first cell. The header of the fifth cell will have an AAU bit value of "1" to identify that cell as the last cell.

For an 8 cell adaptation, the AAL5 packet consists of two MPEG packets of 188 bytes and an 8 byte AAL5 trailer, for a total of 384 bytes. The ATM mux breaks the AAL5 packet (384 bytes) down into eight 48-byte payloads and attaches appropriate 5 byte headers to each payload to thereby form eight 53-byte ATM cells.

The header of all eight of the ATM cells will contain the VPI/VCI value assigned to the particular communication. Continuing the above example, if the MPEG data relates to the program guide or the operating system downloading service, the assigned VPI and VCI values would identify logical network channel 0 as in the above discussed example of the five-cell adaptation. The header of the first of the eight cells will have an AAU bit value of "0" to identify that cell as the first cell. The header of the eighth cell will have an AAU bit value of "1" to identify that cell as the last cell.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, in the above broadcast example, the cells from the one broadcast program all contain the same VPI/VCI value whether the five-cell adaptation was used or the eight-cell adaptation was used.

In the presently preferred embodiment, the ATM mux processes MPEG2 packet streams for a combined program or transport stream capacity of approximately 36 Mbits/s. For simplicity, it is assumed that normal video programs utilize a 6 Mbits/s encoding. Other programs, for example program guide services used for user navigation, downloaded software applications, and video signals with relatively little motion can be efficiently encoded rates below 6 Mbits/s. The ATM mux therefore receives packet streams from up to six real time encoders (RTEs) and one or more data module.

In mapping cells from multiple programs to ATM cells and combining cell streams into a signal bit stream, it is necessary for the ATM mux in the system operated by the VIP 12 to map the PID value from each MPEG2 packet into the correct VPI/VCI value for the corresponding program. The ATM mux therefore is programmed to recognize the PID values of packets for each program and apply the adaptation techniques discussed above and to map the PID values into the assigned VPI/VCI values.

FIG. 3 is a block diagram of the customer premises equipment 14 receiving the ATM cell transport from the ONU 24. The customer premises equipment 14 includes a network interface module 50, a digital entertainment terminal 52, and a conventional television 54 receiving video signals from the DET 52.

Figure 4:
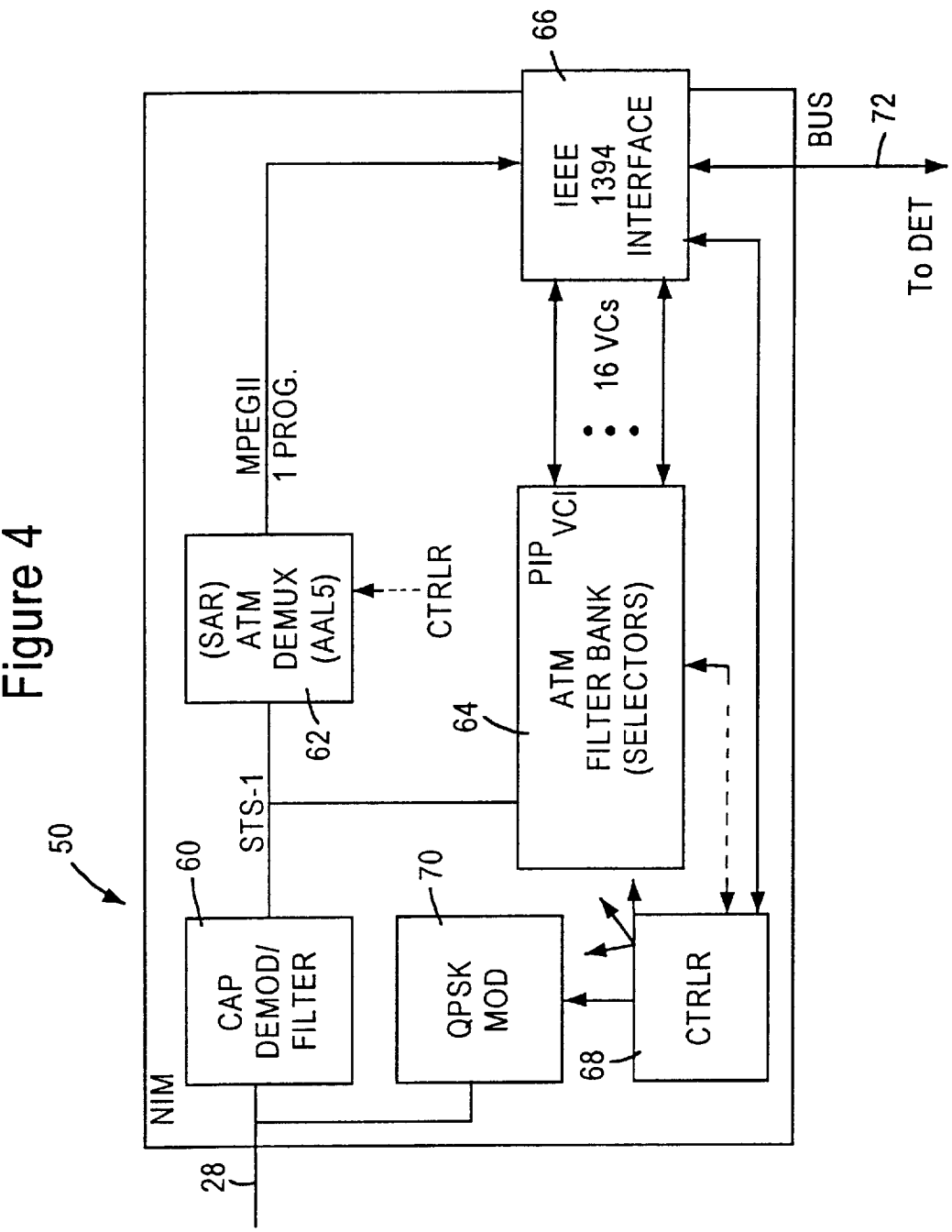
FIG. 4 is a block diagram of the network interface module of FIG. 3.

FIG. 4 is a block diagram showing in detail the NIM 50 of FIG. 3. According to the disclosed embodiment, the NIM 50 captures each ATM cell having a specified VPI/VCI. The NIM 50 includes a CAP interface 60 performing bandpass filtering and demodulation of the signal received from the ONU 24 according to the CAP 16 protocol.

The CAP interface 60 outputs the ATM cell stream in STS-1 format to an ATM demultiplexer 62 and an ATM selector bank 64. In the disclosed embodiment utilizing ATM cell transport to the set-top terminal devices, the ATM demultiplexer is an element of the NIM 50. In other network implementations, the ATM demultiplexer may simply reconstruct the MPEG transport streams and supply those streams to some other mechanism for broadcasting the MPEG streams to the customer premises equipment 14. For example, an alternate network architecture may perform the ATM demultiplexing functions in a video central office before transport on the local loop 28 within a specified RF channel. An example of such an alternate network architecture is found in commonly-assigned, copending application Ser. No. 08/413,207, filed Mar. 28, 1995, U.S. Pat. No. 5,544,161 entitled ATM PACKET DEMULTIPLEXER FOR USE IN FULL SERVICE NETWORK HAVING DISTRIBUTED ARCHITECTURE (attorney docket 680-116), the disclosure of which is incorporated in its entirety herein by reference.

The ATM demultiplexer 62 and the ATM selector bank 64 each receive a multiplexed ATM cell stream carrying ATM cells relating to a number of programs or sessions. The HDT 22 determines which programs are transported by the STS-1 stream, and supplies the ATM cell streams in response to upstream user selection signals. Specifically, user selection signals from the DET 52 are supplied to the NIM 50 via a bus interface 66, described below. The user selection signals are forwarded to a controller 68, which controls channel selection in the ATM demultiplexer 62 and the ATM selector bank 64. If a desired program is not currently received in the STS-1 data stream, the controller 68 outputs user selection signals to a QPSK modulator 70, which outputs the user selection signals onto the cable drop 28 on the assigned upstream signaling channel. In response, the HDT 22 provides the selected program in an ATM cell stream to the customer premises equipment 14 using a specified VPI/VCI supplied to the controller 68.

The ATM demultiplexer 62 performs two functions, demultiplexing the combined stream to recover cells relating to a primary selected video program, referred to as the "primary program", and ATM to MPEG reverse adaptation to strip off the ATM cell headers and reconstruct the MPEG packets carrying the primary video program. The ATM demultiplexer 62 identifies the cells relating to the primary selected video program by their VPI/VCI, which is supplied to the ATM demultiplexer by the controller 68. In the preferred embodiment wherein the ATM demultiplexer is an element of the NIM 50, as part of the demultiplexing function, the demultiplexer captures all MPEG2 packets carried in cells having the specified VPI/VCI value and provides the captured MPEG2 packets to a bus interface 66. The ATM selector bank 64, however, recovers cells related to a secondary selected video program, referred to as the "PIP" program, and passes the selected ATM cells to the bus interface 16. The ATM selector bank 64 selects the secondary selected video programs or other ATM cell streams, for example ATM cell streams carrying downstream signaling data or software data, in response to the VPI/VCI values supplied by the controller 68. Hence, the controller 68 controls selection of incoming ATM cell streams from the incoming STS-1 transport stream.

Other demultiplexing functions are possible depending on where the ATM demultiplexer fits into the overall network architecture. For example, the ATM selector bank 64 is adapted to output up to sixteen (16) ATM virtual channels to the interface 66. As described below, the interface 66 may supply the primary MPEG2 program transport stream from the ATM demultiplexer 62 and the 16 virtual channels from the ATM selector bank 64 to a plurality of DETs 52 via a bidirectional bus 72. Hence, the NIM 50 can provide multiple outputs to multiple DETs 52. Alternately, the hybrid fiber coax based system disclosed in the above-incorporated application Ser. No. 08/413,207 (attorney docket 680-116), an ATM packet handler performs the ATM demultiplexer function. That packet handler provides multiple output rails each of which carries a combined MPEG2 packet stream for 4 programs for broadcast in one 6 MHz RF channel. The NIM captures a combined stream from an RF channel, and an MPEG decoder in the DET processes packets for one of the 4 programs based on PID value recognition.

As part of the reverse adaptation functionality, the ATM demultiplexer 62 buffers cells until it finds a cell having an AAU value of "0" in its header (first cell) and another cell having an AAU value of "1" in its header (last cell). The AAL5 trailer contains a two byte length indicator specifying the number of data bytes contained in the AAL5 PDU.

If the ATM demultiplexer 62 has captured five cells, the ATM demultiplexer 62 pulls out the payload data and uses the CRC data do check for errors. If there are no errors, the original MPEG packet is reconstructed from the appropriate bytes of payload data from the first four cells. Similarly, if the ATM demultiplexer 62 has captured eight cells, the ATM demultiplexer 62 pulls out the payload data, does the CRC based error check, and if there are no errors, the original pair of MPEG packets is reconstructed from the appropriate bytes of payload data from the eight cells.

The bus interface 66 is a high speed two-way interface that supplies the primary program in MPEG2 format in parallel with ATM cell streams output from the ATM selector bank 64. The bus interface 66 operates in accordance with the published standard IEEE 1394, and will output onto the bus 72 at a data rate of 100 Mbit/sec. Hence, since the NIM 50 receives the ATM cell streams from the cable drop 28 at a rate of 51 Mbits/sec, the bus 72 has sufficient bandwidth for simultaneously transporting the primary program in MPEG2 format and the sixteen virtual channels of ATM cell streams from the ATM selector bank 64, plus additional traffic for two-way signaling between the NIM 50 and the DETs 52 coupled to the NIM 50.

Figure 5:
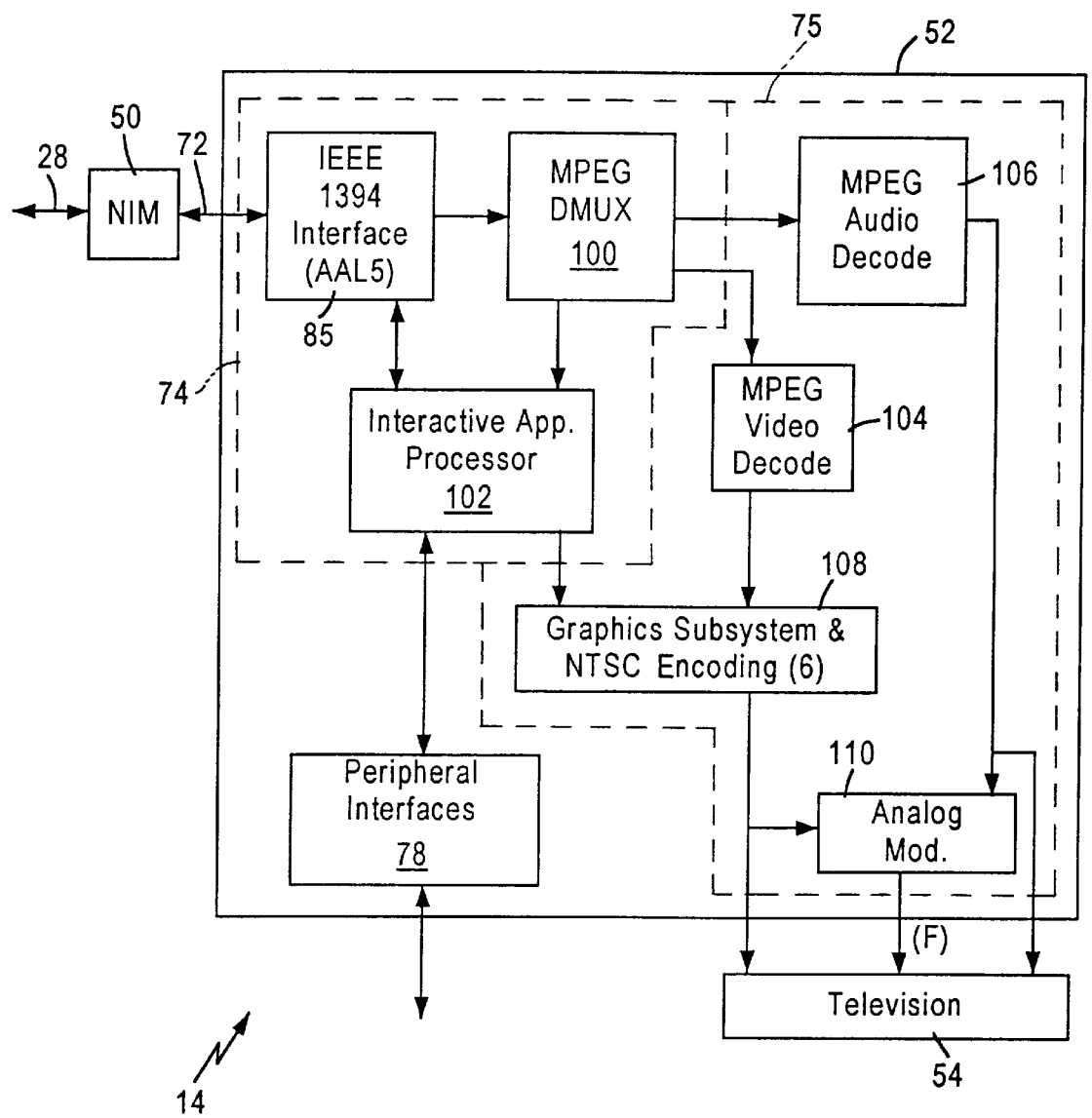
FIG. 5 is a block diagram of the digital entertainment terminal according to another embodiment of the present invention.

FIGS. 3 and 5 are block diagrams illustrating different embodiments of the DET 52 of the present invention. The DET 52 portion of the set-top device in FIG. 3 includes an application processor 74, a digital video processor 75, and a peripheral interface 78. The DET 52 also includes non-volatile random access memory 80*a*, 80*b* for example electrically erasable programmable read only memory (EEPROM) or flash memory. Specifically, the DET 52 includes a RAM 80*a* for use by the application processor 74, and the digital video processor 75 comprises a media processor 76 and a RAM 80*b*. The RAM 80*a* and 80*b* each have a non-volatile portion for storing the operating system and software programming for the application processor 74 and the media processor 76, respectively. The software stored in the RAM 80*a* and 80*b* defines the basic functionality of the respective processors 74 and 76 in the DET 52. For example, the operating system stored in the RAM 80*a* controls how the application processor 74 interprets application programs. The operating system stored in the RAM 80*a* also includes the various driver routines permitting the application processor to operate the other elements of the DET. The operating system stored in the RAM 80*a* and 80*b* also includes the basic or 'resident' application under which the DET operates when not running a downloaded application. The resident application preferably emulates a cable television type program reception type user interface for the particular network to which the set-top connects.

According to the embodiment of FIG. 3, the DET 52 operates as a distributed processing system, where the application processor 74 performs the background DET functions including control of DET operations, execution of downloaded applications, user interface functions, and generating upstream channel request and signaling messages in response to user inputs. The digital video processor 75 is a processing system dedicated to decompressing and decoding MPEG encoded data. The media processor 76 of FIG. 3 may be implemented as an enhanced microprocessor having multimedia-specific and digital signal processing instruction sets. The media processor 76 also includes high-bandwidth I/O to perform multimedia operations and MPEG decoding in real time. Hence, the RAM 80*b* stores operating system programming and instruction sets for optimized MPEG2 decoding and multimedia applications.

The memory 80*a* also includes channel mapping data enabling to DET 52 to correlate logical channels corresponding to user selection inputs with VPI/VCI values and MPEG2 transport stream PID values. For example, the bus 72 supplies a primary program as an MPEG2 transport stream to the DET 52 and at least one secondary program as ATM cell streams having specified virtual channels. The application processor 74 includes a complementary bus interface 85, such as shown in FIG. 5, that accesses the MPEG2 stream and the ATM cell streams from the bus 72 in accordance with the IEEE 1394 interface standards and outputs the MPEG2 stream carrying the primary program to the digital video processor 75. The MPEG2 stream carrying the primary program data is supplied by a direct memory access (DMA) arrangement along data path 82, or alternately by outputting the MPEG2 compressed data to a dual-port buffer memory (not shown).

Figure 8:
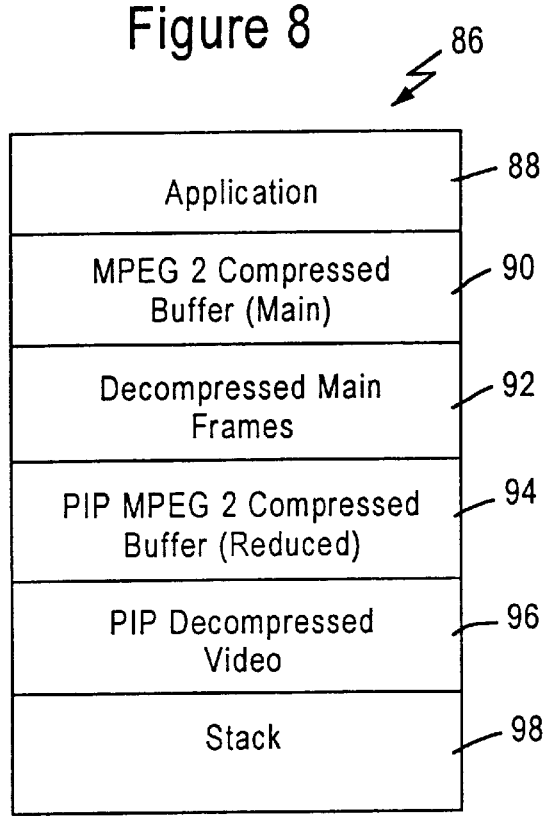
FIG. 8 is a diagram showing memory regions in the memory elements of FIG. 3.

The memory 80*b* acts as a buffer and stores at least the compressed and decompressed video data of the primary program. The memory 84 is adapted for high-speed storage and retrieval of data. FIG. 8 is a diagram of memory regions in the DET 52, which comprises the memory components 80*a* and 80*b*. As described below, the partial MPEG processing of a secondary (PIP) video program may be performed by either the application processor 74 or the digital video processor 75.

Implementation of Picture-in-Picture (PIP) or Picture-on-Picture (POP) requires decompressing two MPEG-encoded streams of data. The present invention performs PIP processing by performing full MPEG2 decoding of the compressed video data carrying the primary program, and partial decoding of a portion of the compressed video data carrying the secondary (PIP) program. According to the disclosed embodiment, the digital video processor 75 stores a plurality of frames of the compressed MPEG2 data for the primary program in memory region 90, implemented within the RAM 80*b*. The data is transferred into the RAM 80*b* through a DMA arrangement.

The digital video processor 75 accesses the compressed MPEG2 data frames from the memory region 90, performs full MPEG2 decoding on the retrieved data frames, and temporarily stores the digital video data representing the decompressed frames of the primary program in a memory region 92. As known in the art, the decompressed frames of the primary program will be output to the memory region 92 at a data rate of approximately thirty (30) frames per second. The decompressed data will be retrieved from the memory region 92 at the frame rate of approximately 30 frames per second for final graphics overlay processing, described below.

The application processor 74 processes secondary (PIP) images by retrieving the corresponding MPEG2 encoded data streams from the bus 72. The portion of the compressed frames for the secondary images from the MPEG-encoded data stream are stored in a memory region 94. Alternately, the entire secondary program could be stored in memory. If the portion of the MPEG-encoded data stream of the secondary program is to be processed by the application processor 74, the memory region 94 is implemented in the memory 80*a*; alternately, if the portion of the secondary program is to be processed by the digital video processor 75 by limited-resolution decoding, also referred to as partial decompression, the memory region 94 is implemented in the RAM 80*b*. Hence, the portion of the secondary program is processed by the data being transferred to the digital video processor memory by DMA transfer. The processor performing the partial decompression on the portion of the MPEG-encoded data stream from the buffer 94 outputs decompressed video data representing reduced-resolution frames of the secondary (PIP) video program and stores the video data into a memory region 96 at a frame rate of, for example, ten (10) frames per second.

Once the video data for the secondary video program is stored in the memory region 96, the digital video processor 75 accesses the secondary video program data, performs the PIP overlay processing as described below, and outputs to a television set 54 the primary and secondary images as a video signal representing a frame of the primary video data having a portion overlaid by the decompressed secondary video data.

The partial MPEG2 processing to obtain the secondary (PIP) image can be performed in either the application processor 74 or the digital video processor 75. The application processor 74 can perform the partial MPEG2 processing by executing a software routine stored in the memory 80*a* at memory region 88 (see FIG. 8). The application processor 74, implemented for example using a Power PC chip from Motorola, has sufficient processing capacity to perform the partial MPEG2 processing while at the same time maintaining overall operations of the DET 52 including processing user commands from the user interface 78, upstream signaling, etc.

Alternately, the digital video processor 75 can perform the partial MPEG2 processing of the second stream of compressed data stored in the buffer region 94 during idle intervals between frames from the main MPEG2 program stream stored in buffer portion 90. In other words, full MPEG2 processing of the primary program data stored in the buffer memory 90 does not use the full processing capacity of the digital video processor 75. Hence, the residual processing capacity is used to perform the partial MPEG2 processing of the second stream of the second program (PIP).

FIG. 5 discloses an implementation of the DET 52 according to one embodiment of the present invention. As shown in FIG. 5, the DET 52 includes an application processor 74 having an interface 85, an MPEG demultiplexer 100, and an interactive application processor 102 controlling overall operations of the DET 52. The interface 85 receives compressed video data from the bus 72 and outputs the MPEG2 transport streams of the primary video program to the MPEG demultiplexer 100 and the MPEG2 transport stream of the secondary (PIP) video program to the MPEG demultiplexer 100. If necessary, the interface 85 performs any necessary AAL5 processing on ATM cell streams from the bus 72 having a specified VPI/VCI to recover the MPEG2 transport stream of the secondary program.

If the DET 52 receives only a multiplexed stream of MPEG2 data packets from a channelized network system as shown in the incorporated application Ser. No. 08/413,207, U.S. Pat. No. 5,544,161, (attorney docket 680-116), then the interface 85 passes the MPEG2 transport streams to the MPEG demultiplexer for identification by the corresponding PID values. Downloaded software is transferred as private data to the processor 102 of the DET. Hence, if the software relates to an operating system, the application processor 74 executes an upgrade routine as described in the above-incorporated application Ser. No. 08/498,265, U.S. Pat. No. 5,666,293, (attorney docket 680-083D) to replace the existing operating system stored in non-volatile RAM 80 at memory portion 88 with the newly received operating system software.

The MPEG2 demultiplexer 100 removes and processes the transport layer header information, including recreating the system time clock required for MPEG decoding and display. The MPEG2 demultiplexer 100 also parses the Program Association Tables (PAT) and the Program Map Tables (PMT) found in the transport stream. Each 188 byte MPEG2 transport packet is routed to the appropriate location based on the PID and the information taken from the PAT and PMT packets.

The digital video processor 75 of FIG. 5 is implemented as a dedicated MPEG-processing system including an MPEG video decoder 104, an MPEG audio decoder 106, and a graphics subsystem 108. If desired, the digital video processor 75 also includes an analog modulator 110 for converting the digital video data to an analog video signals for an analog television.

The MPEG demultiplexer 100 outputs the MPEG2 stream carrying the primary video program to the MPEG video decoder 104 for full MPEG2 decompression and decoding of the MPEG2 video elementary stream into an uncompressed digital video signal. Similarly, the MPEG demultiplexer 100 outputs the MPEG2 stream carrying the corresponding audio for the primary video program to the MPEG audio decoder 106 for decompression and decoding of the MPEG2 audio elementary stream into an uncompressed digital audio signal.

According to the embodiment of FIG. 5, the MPEG video decoder is an application specific IC (ASIC) dedicated to decode only one video program. Hence, the second (PIP) video program is decoded by the interactive application software 102. The interactive application processor 102 comprises a general purpose microprocessor or RISC device such as the commercially-available Motorola Power PC, and any required memory such as application DRAM, non-volatile RAM, ROM, EEPROM, and flash memory. The processor 102 executes software having a routine for partially decompressing MPEG-encoded data and outputting decompressed video data at a reduced frame rate, for example 10 frames per second. Specifically, the processor 102 executes software to parse the transport packets of the secondary (PIP) program and remove the video elementary stream data. The video elementary stream data will then be decoded by the interactive application processor 102.

Current generation general purpose processors are incapable of fully decoding an MPEG2 video signal in real time. Hence, the interactive application processor 102 decodes a subset of the MPEG2 video signal for display. Although the quality of the software-decoded video signal may be less than the quality of the video signal decoded by the MPEG video decoder 104, sufficient quality may be obtained to provide satisfactory PIP processing.

The inventors have considered a number of possible algorithms for reduced-set decoding of MPEG compressed signals. For example, the downloaded application having the routine for partially decompressing the second data stream can control the processor 102 to decode only some or all of the I-frames of the secondary stream to produce the inset video. As an alternative example, the microprocessor could decode only I and P frames of the secondary program. The reduced-set decoding of MPEG compressed video data will become more readily apparent after a review of MPEG2 processing to fully decompress an encoded signal, for example the primary video program.

Figure 6A:
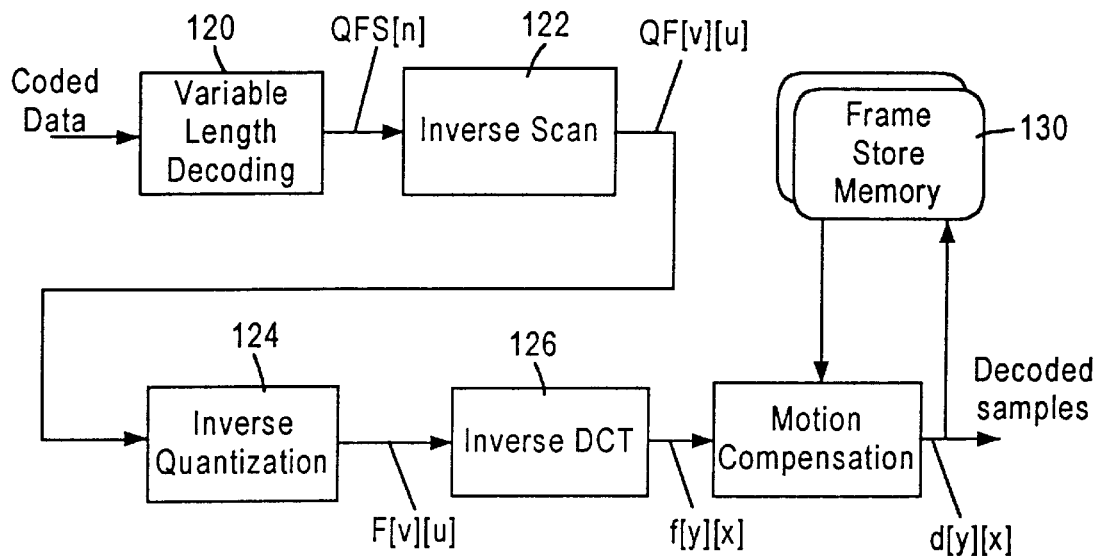
FIGS. 6A and 6B are diagrams illustrating MPEG decoding and inverse scanning, respectively.
Figure 6B:
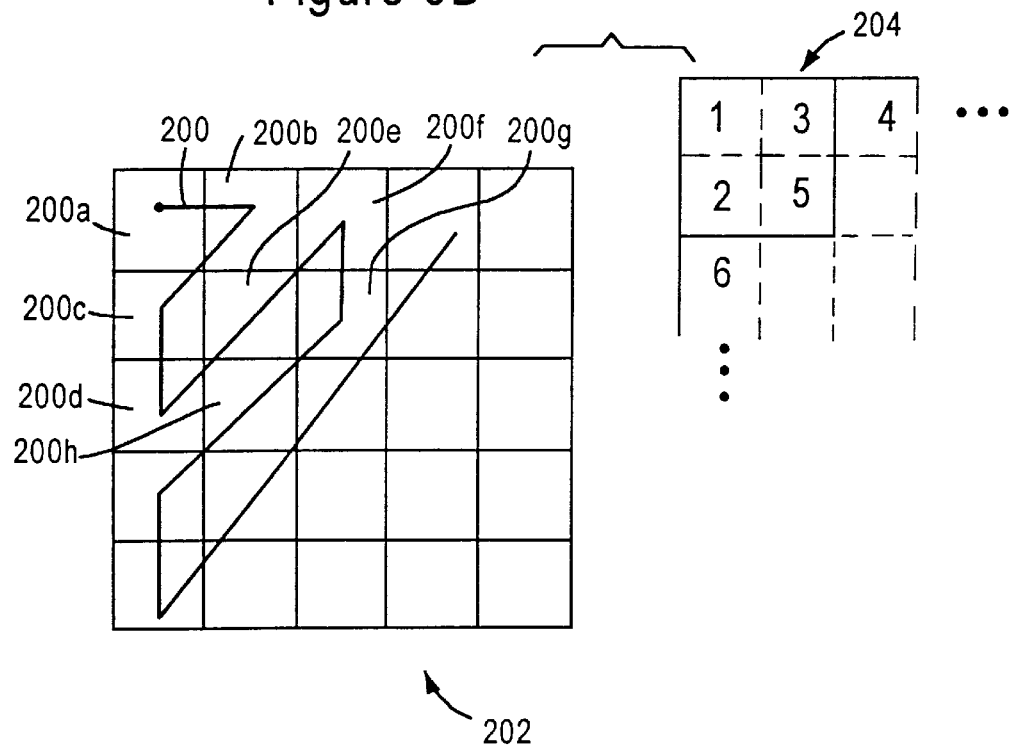

FIGS. 6A and 6B illustrate conventional MPEG2 processing executed by the MPEG video decoder 104 to recover decoded video samples. MPEG (moving picture experts group) is a broad generic standard for digital video program compression. A number of specific compression algorithms will satisfy MPEG requirements. MPEG2 is a second generation compression standard capable of encoding video program material into a 6 Mbits/sec bit stream and packetizing a number of 6 Mbits/sec channel streams into a single higher rate signal transport stream. MPEG is a bi-directional predictive coding compression system, coded in accordance with discrete cosine transformation (DCT) processing. Picture elements are converted from spacial information into frequency domain information to be processed. Compression is begun by discarding information to which the human visual system is insensitive.

From the remaining information, an actual video reference frame, or I frame, is periodically used. The number of frames to be coded for each such I frame is set in the MPEG syntax, e.g., one reference frame for each fifteen frames, or every half second. A prediction is made of the composition of a video frame, termed a P frame, to be located a specific number of frames forward and before the next reference frame, the specific number also set in the MPEG syntax. Information from previous frames as well as later frames is used in formulating the prediction. "Delta" information is developed for coding the frames, called B frames, between the actual and predicted frames, also by looking at frames in both directions. Rather than updating a whole frame, only the changed (or delta) information is provided for the delta frames. Thus the total information coded, and then transmitted, is considerably less than required to supply the actual information in the total number of frames. Typically, between I frames is a succession of two B frames followed by one P frame.

On decompression, the decoder in sequence uses the reference frame to form the prediction frames, these frames being used to construct the delta frames. Data is thus decoded in an order different from the order in which frames are viewed. Decoding must be several frames ahead of the frame currently shown on video.

The MPEG2 standard also provides a standardized format for packetizing the compressed audio and video information and for transporting other data. Under the MPEG2 standard, incoming individual video signals and related audio signals are encoded and packetized into respective Video and Audio Packetized Elementary Streams (PES). The video and audio PES's from one or more sources of video programming may be combined into a transport stream for transmission or storage PES packets made up of elementary streams that form a program share a common time base. The transport stream is designed for use in environments where errors are likely, such as storage or transmission via a noisy media. Transport stream packets are 188 bytes in length. Transport stream packets generally consist of two sections, a header section and a payload section. The header information includes, inter alia, a synchronization byte, transport scrambling control and a thirteen bit program identification (PID) number. PID value 0 is reserved as an indication that the packet includes program association table data. PID value 1 is reserved for identification of packets containing conditional access data, such as encryption information. PID value 0x1FFF is reserved for null packets utilized for synchronizing the link. The other program identification numbers are utilized to identify transport packets with the program source from which they originate.

A program association table (packet PID 0) maps each program source with the PID value associated with a program map related to that source. Thus, the program association table defines the packet location in the transport stream of a program map for each source of programming in the transport stream. The program map, in turn, specifies the PID values for packets continuing video, audio and/or data from the particular source. For example, the program map for CBS might be found in packets corresponding to PID 132; the program map for NBC might be found in packets identified by PID 87 and so forth. The program map for CBS in the packet with PID 132 would then identify the PID numbers for the actual packetized elementary streams (PES) for the video and audio channels associated with the CBS program.

Referring to FIG. 6A, the MPEG2 decoder begins by receiving a frame, for example an I frame, that is encoded in variable length code words using run length encoding and Huffman encoding. The decoding performs variable length decoding in step 120 to obtain a one-dimensional list of quantized (Q) discrete cosine transform (DCT) frequency coefficients (QFS[n]). After obtaining the DCT coefficients, inverse scan coding is performed in step 122 to recover an 8×8 matrix of the DCT coefficients within the spatial array.

Specifically, FIG. 6B shows a run length encoding sequence 200 along a pixel array 202. During MPEG encoding, run length encoding begins by encoding the DC component at location 200a, and continues scanning along the sequence 200b, 200c, 200d, 200e, 200f, 200g, 200h, etc. to obtain the higher frequency components. Hence, if the DCT coefficients were arranged along the sequence 1, 2, 3, 4, 5, 6, etc., the inverse scanning step 122 would apply the inverse matrix 204 to obtain the 8×8 matrix array (QF[v][u]).

After inverse scan, the MPEG video decoder 104 performs inverse quantization in step 124 according to a known quantization table (Q) to recover the DCT frequency coefficient values (F [v][u]). Inverse DCT transformation is then performed in step 126 to transform the frequency coefficients back into pixel values (f[y][x]).

After recovering the pixel values, motion compensation is performed in step 128 with respect to P frames and B frames. Specifically, the recovered time-domain frame values are buffered in step 130 to map motion vectors to prior or subsequent frames. As known in the art, I frames do not need motion compensation because I frames are coded with respect to its own pixels. The P frames and B frames, however, are coded with respect to future and previous frames. Hence, the decoded frames are buffered in the buffering step 130 to perform a block-by-block comparison in step 128, where motion vectors associated with a certain block are mapped with respect to other reconstructed frames to recover the B frames and P frames. The reconstructed video data (d[y][x]) is thus output from the MPEG video decoder 104 at a frame rate of 30 frames per second.

Hence, the MPEG2 decoding process shown in FIG. 6A uses all the information supplied in the MPEG2 transport stream to reconstruct a video image having the highest possible resolution. According to the present invention, the term "resolution" refers to the reproduction quality of the decompressed video signal, and is determined by, inter alia, the number of frames per second, use of I, P and B frames, using all the DCT coefficients, and processing both luminance and chrominance signals. Thus, the primary video program output by the DET has the highest possible resolution on the basis of decoding all available information from the MPEG2 program transport stream. However, processing the MPEG2-encoded stream carrying the primary program requires a relatively large amount of processing capacity. Hence, two dedicated processors are required for simultaneous processing of two MPEG-encoded transport stream to obtain video signals at full resolution.

Figure 7:
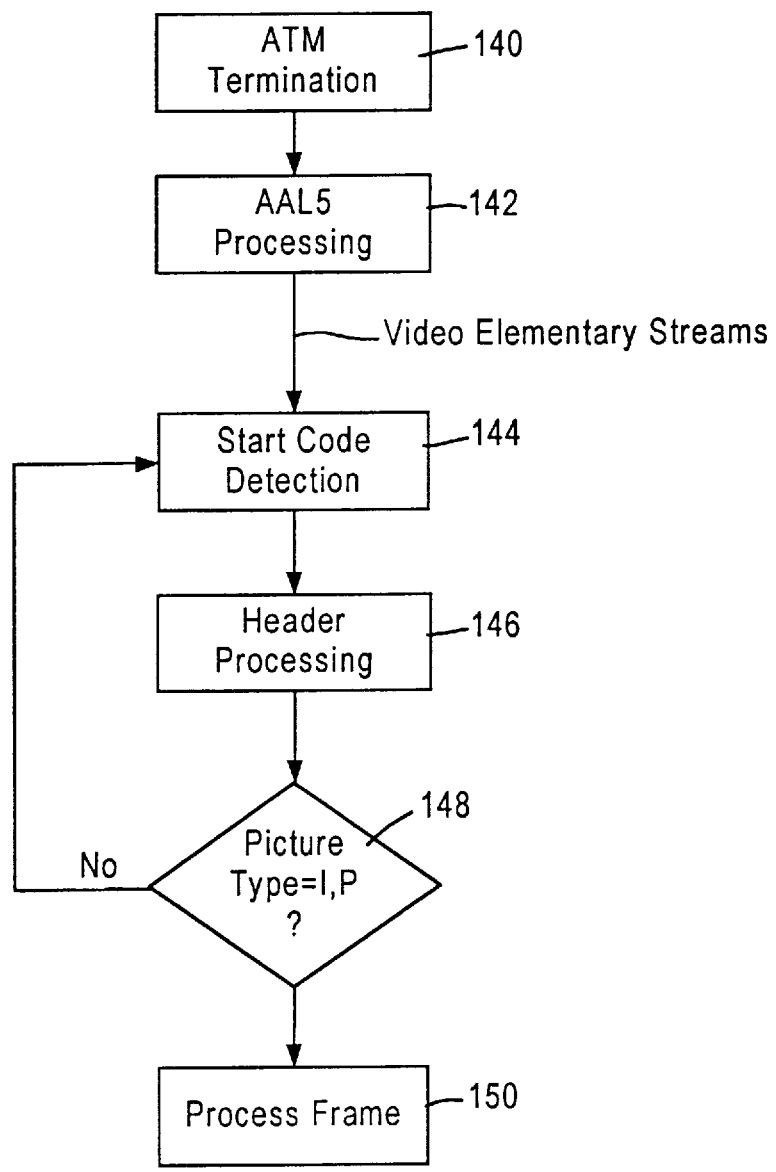
FIG. 7 is a flow diagram illustrating the process of filtering an ATM stream to obtain a partial MPEG-stream for limited resolution processing.

According to the present invention, the processing requirements of the second MPEG transport stream is reduced by performing partial decompression to obtain limited-resolution video data of the secondary program. In other words, a decompressed video signal has less "resolution" if all available data is not used during the MPEG2 decoding to recover the highest quality reproduction of the video program. The partial decompression of the MPEG-encoded stream is performed by filtering out B frames, and possibly P frames and some I frames. FIG. 7 is a flow diagram showing the processing of the second MPEG-encoded program (PIP) stream. The ATM cell stream having the desired VPI/VCI is first selected in step 140, and AAL5 processing is then performed in step 142 to recover the packetized video elementary streams. After performing transport demultiplexing the system performing the partial decompression (i.e., the interactive application processor 102) searches for the start code in step 144 identifying the presence of a header. After receiving a start code in step 144, header processing is performed in step 146 for the received header, for example a sequence header, group-of-pictures header, or picture header. After header processing, the picture type is checked in step 148 to determine if an I frame or a P frame has been received. If an I frame or P frame has not been received (i.e., a B frame or audio frame has been received), the received frame is ignored and the process returns to step 144 for code detection. However, if in step 148 the picture type indicates an I frame or a P frame, then the frame is decoded in step 150 according to a partial decoding, described below.

Hence, the application processor 102 filters out the B frame from the MPEG-encoded stream of the second program to process a fewer number of frames. Hence, frame reordering is no longer necessary since only the I and P frames are processed. If desired, the P frames may also be partially or entirely filtered out, for example so that only I frames are processed. In addition, the application processor may selectively skip I or P frames upon detection of a processing delay during the partial decompression of the MPEG-encoded video data of the second stream. Processing delays can be determined by correlating PCR and PTS values of the second program to the respective values of the primary program processed by the MPEG video decoder 104. Hence, the application processor 102 avoids any delays due to limitations in processing speed or capacity.

The partial decoding in step 150 can also be performed by limiting the DCT coefficients used to generate the pixel values f[y][x]. Instead of using a full 8×8 matrix of coefficients, the partial decoding may use only a 4×4 subset of coefficients, a 2×2 subset of coefficients, or only the DC subset of coefficients. Alternately, the partial decoding in step 150 may decode only the luminance signal, namely the "Y" component with no color, or may decode a different subset of DCT coefficients for chrominance and luminance signals. In addition, reducing the number of frames processed per second down to 2 frames per second can reduce the processing requirements.

Hence, a limited-resolution representation of the second program can be obtained by a variety of techniques, for example reducing the frames processed per second, selectively skipping I, P, and B frames, using a reduced set of DCT coefficients, and/or neglecting chrominance processing. Any of these techniques may be used to obtain limited-resolution video data, reducing the processing requirements of the processor 102. Table 1 summarizes various combinations for performing partial processing and the resulting quality observed during the partial processing.

data having a reduced resolution to the graphics subsystem 108 at a frame rate of 10 frames per second. The graphics subsystem comprises a frame buffer memory that stores the received frames of video data. Hence, although the partially-decoded secondary video data is output at a rate of 10 frames per second, the graphics subsystem 108 repeats the secondary repeated to generate an effective rate of 30 frames per second. The graphics subsystem 108 combines the primary and secondary video data by creating an overlay plane where the first video data has a portion overlaid by the secondary video data. If desired, the graphics subsystem 108 also performs NTSC, PAL or SECAM encoding to generate a composite analog video signal containing the fully decoded primary video and the secondary video data as an inset. The baseband analog video signal can be sent directly to the baseband input jack of the television 54, or it can be modulated onto another channel by the analog modulator 110.

According to the above embodiment, partial MPEG decoding is performed by execution of software by the application processor 74. Hence, video information providers can offer video services including picture-in-picture by downloading the PIP software to the DET 52.

According to another embodiment, the digital video processor 75 shown in FIG. 3 can perform the partial MPEG decoding on the secondary MPEG transport stream by executing a modified instruction set stored in the RAM 80b. Specifically, the first embodiment was directed to execution of software by the application processor to provide the

TABLE 1

| Video Decode Mode | Max frames per sec. | I-Frame | P-Frame | DCT Coefficients | Chrominance | Quality Notes |
|---|---|---|---|---|---|---|
| I-0 | 2 | yes | no | DC Only | No | Black and White, Blocky, Very Jerky Motion |
| I-1 | 2 | yes | no | 2 × 2 DCT | No | ", Minimal Blocking |
| I-2 | 2 | yes | no | 4 × 4 DCT | No | ", Minimal Blocking |
| I-3 | 2 | yes | no | Full DCT | No | ", No Blockiness |
| I-4 | 2 | yes | no | DC Only | Yes | Full Color, Blocky, Very Jerky Motion |
| I-5 | 2 | yes | no | 2 × 2 DCT | Yes | ", Minimal Blocking |
| I-6 | 2 | yes | no | 4 × 4 DCT | Yes | ", Minimal Blocking |
| I-7 | 2 | yes | no | Full DCT | Yes | ", No Blockiness |
| P-0 | 10 | yes | yes | DC Only | No | Black and White, Slightly Jerky Motion, Blocky with artifacts |
| P-1 | 10 | yes | yes | 2 × 2 DCT | No | ", Minimal Blocking |
| P-2 | 10 | yes | yes | 4 × 4 DCT | No | ", Minimal Blocking |
| P-3 | 10 | yes | yes | Full DCT | No | ", No Blockiness |
| P-4 | 10 | yes | yes | DC Only | Yes | Full Color, Slightly Jerky Motion, Blocky with artifacts |
| P-5 | 10 | yes | yes | 2 × 2 DCT | Yes | ", Minimal Blocking |
| P-6 | 10 | yes | yes | 4 × 4 DCT | Yes | ", Minimal Blocking |
| P-7 | 10 | yes | yes | Full DCT | Yes | ", No Blocking |

Hence, the processing requirements for a second (PIP) program are reduced by filtering B frames from the MPEG-encoded stream and performing partial processing on the portion of the remaining MPEG frames. If necessary, additional I and P frames may be skipped to further increase the effective processing.

Referring to FIG. 5, the MPEG video decoder 104 outputs the fully-decoded (decompressed) primary video data having full resolution to a graphics subsystem 108 at a frame rate of 30 frames per second, respectively. The interactive processor 102 outputs the partially decoded secondary video decompressed video data for the secondary (PIP) program. In this embodiment the digital video processor 75 performs the partial processing on the I and P frames of the secondary program transport stream to obtain the decompressed video.

Figure 9:
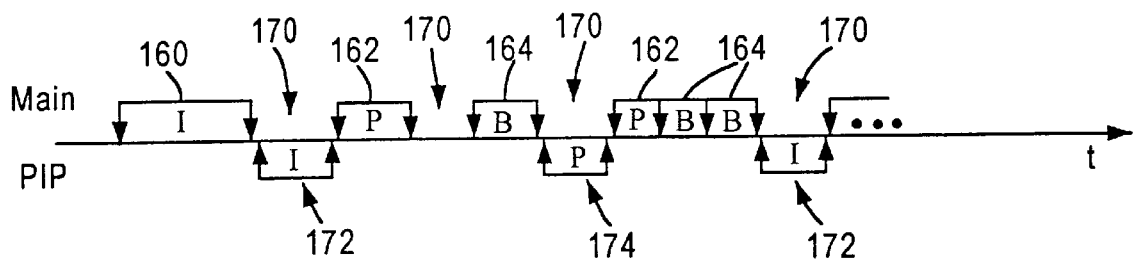
FIG. 9 is a time sequence diagram illustrating dual-video processing by an MPEG decoder according to an embodiment of the present invention.

As shown in FIG. 9, the MPEG2 decoding of the primary program transport stream includes the optimized processing for the corresponding I frames 160, P frames 162, and B frames 164. Since the digital video processor 75 is optimized for MPEG2 decoding, idle intervals 170 will be present after the processing of some of the frames from the primary program transport stream.

Hence, the digital video processor 75 detects the idle state upon completion of a frame, and uses the idle intervals 170 to perform the partial decompression of the I frames 172 and the B frames 174 of the secondary (PIP) program transport stream. The partial decompression performed by the digital video processor 75 may be executed by varying the decompression parameters summarized in Table 1 above. In addition, the digital video processor may selectively skip some of the I frames 172 and P frames 174 upon detecting a processing delay between the respective PCR and PTS values of the primary and secondary (PIP) transport streams.

As described above, the software controlling operation of the media processor in partially decompressing the secondary (PIP) transport stream is stored as a modified instruction set in the RAM 80b. The software may be downloaded by a technician via the interface 78 which can accommodate, for example, a PCMCIA card. Preferably, however, the software is downloaded from the network 10, for example as an enhanced service offered by the VIP 12. Specific details about downloading software into the DET 52 is disclosed in the above-incorporated application Ser. No. 08/498,265 (attorney docket 680-083D).

According to still another embodiment, the interactive application processor 102 monitors the operations of the MPEG video decoder 104 to determine an idle state 170 during processing of the primary MPEG2 program transport stream. Upon detection of an idle state, the interactive application processor 102 outputs a portion of the secondary MPEG2-encoded (PIP) transport stream, for example by filtering out the B frames, to the MPEG video decoder 104 for processing. The interactive application processor 102 may selectively filter either the B frames, or both B and P frames so that only I frames are supplied to the decoder 104. Hence, the MPEG decoder 104 decompresses the primary MPEG stream into first video data having a first resolution, and partially decompresses the secondary (PIP) MPEG stream into second video data having a second resolution less than the first resolution.

According to the present invention, two MPEG-encoded video streams are decoded using conventional DET hardware in order to simultaneously display the respective programs in a Picture-in-Picture or Picture-on-Picture format. A portion of the secondary video stream is used to generate the decompressed video data in order to reduce the necessity of frame reordering, buffering, etc. In addition, partial processing is performed on the portion of the secondary video stream to reduce the processing requirements on the device executing the decoding.

Hence, the PIP processing of the present invention is particularly advantageous for users who wish to view a sports event while playing an interactive game. The sports event can be viewed as a PIP program during slow play, etc. However, if a user wishes to watch the last two minutes of the sports event, the user can suspend the IMTV game, and switch the sports event as the primary program. The DET in response reroutes the MPEG2 transport stream carrying the sports event as the primary program and the MPEG2 transport stream carrying the IMTV game as the secondary (PIP) program.

Although the disclosed embodiments describe the decoding of merely two MPEG-encoded transport streams, it will be appreciated that additional MPEG-encoded transport streams may be decoded, depending on the resolution requirements of the video data and the processing capabilities of the decoding systems. For example, one having ordinary skill in the art will appreciate that a DET may simultaneously output to a television display three or four limited-resolution images.

In addition, the digital entertainment terminal 52 or components thereof may be implemented as a plug-in card for upgrading existing analog set-top boxes. If the television 54 accepts digital video data and has PIP or POP capabilities, the cost of the DET 52 may be further reduced by replacing the graphics subsystem 108 with a frame buffer memory that outputs the primary and second decompressed digital video streams at a synchronized 30 frames per second.

Since the Network Interface device (NIM) is the physical interface to the digital video network, any type of digital video network architecture may be used to supply at least two encoded video transport streams to the DET. An example of an arrangement using a wireless digital network is disclosed in commonly-assigned, copending application Ser. No. 08/405,558, filed Mar. 16, 1995, U.S. Pat. No. 5,651,010, entitled SIMULTANEOUSLY OVERLAPPING BROADCASTING OF DIGITAL PROGRAMS (attorney docket No. 680-130), the disclosure of which is incorporated in its entirety by reference. Alternately, the digital video data may be received over a wide area packet switched network, for example the Internet.

Another variation of the disclosed embodiments involves fully decoding only a viewed portion of the primary program. Specifically, overlaying the secondary (PIP) program over the primary program causes a portion of the primary program of interest to be covered up by the PIP inset. Since the covered portion of the primary image is not visible to the viewer, it does not need to be fully decoded. Hence the media processor of FIG. 3 and the MPEG2 decoder 104 of FIG. 5 can be freed from the responsibility of fully decoding the covered portion of the primary video, so that significant processing power may be freed up for other tasks, such as decoding the PIP image.

The modified decoding of the primary program is implemented by fully decoding the I and P frames of the primary video and reducing decoding of the B-frames of the primary image in the areas that are covered by the PIP inset. The I and P frames are fully decoded because they are used by subsequent frames in the motion compensation process. For example, a Group of Pictures (GOP) is typically constructed of 15 frames of video. The first frame of a GOP is an I frame. This frame is fully decoded in the covered area because subsequent frames may have motion that is estimated from portions of the I frame that are covered by the PIP inset. If the covered portion of the I frame is not decoded, the estimation of subsequent frames that used this covered area for prediction will be incorrect. These decoded subsequent frames would therefore contain obvious uncorrectable errors in any decoded macroblock (16×16 pixel region) that was predicted from a portion of the image that was covered and not fully decoded. These errors could continue to propagate until the next I frame, and would be particularly visible in cases where objects experienced motion from behind the PIP inset out into the uncovered portion of the primary video image.

Unlike the I and P frames, the B frame is not used for prediction purposes, and therefore does not need to be fully decoded. Since the PIP inset will cover a contiguous rectangular portion of the primary image, the blocks that are fully covered can be easily identified. In addition, the PIP inset can be placed in different portions of the screen at different times under the control of applications processor 74 in response to user inputs.

The PIP inset location is determined by the pixel location of the top left corner and the bottom right corner of the inset image. Given these two points, the MPEG2 decoder can determine whether a given block is fully covered by the PIP inset or not.

Figure 10:
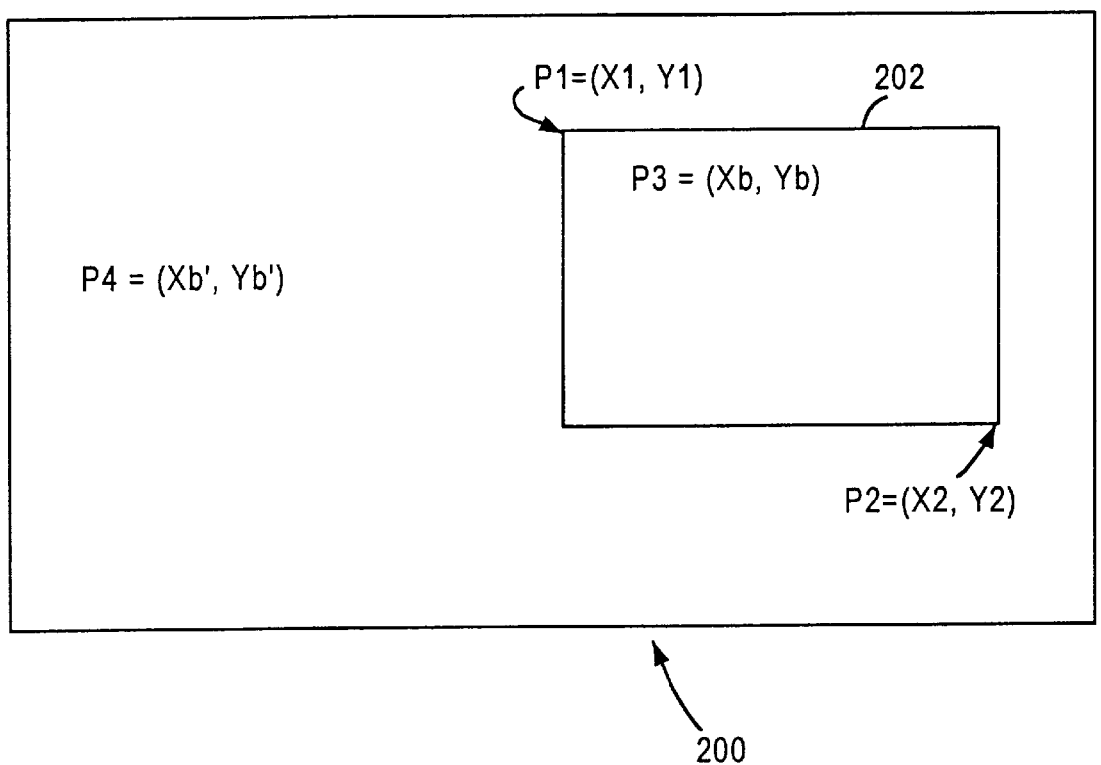
FIG. 10 is a diagram showing a display structure of a primary image and a secondary (PIP) image overlying the primary image.

FIG. 10 illustrates a frame 200 having a primary and secondary (PIP) program. A block defines an 8×8 pixel region of the image. A macroblock defines a 16×16 region of the image, made up of 4 blocks of luminance and one block each of the chrominance components U and V.

As shown in FIG. 10, the rectangle 202 covered by the PIP inset is defined by the two pixel locations, namely pixel P1=(X1,Y1) and pixel P2=(X2, Y2). Any block of the primary video in which every pixel of the block is within the rectangle 202 defined by pixels P1 and P2 does not need to be fully decoded. A pixel within a block P$b$=(Xb,Yb) is covered by the PIP inset 202 if both of the following are true:

X1<=Xb<=X2 AND Y1<=Yb<=Y2

This test can be repeated for each of the four corners of the block. If any pixel fails the test, then the block is not fully covered by the PIP inset and should be fully decoded.

As shown in FIG. 10, pixel P3 is covered by the PIP inset 202, whereas pixel P4 is not covered by the PIP inset 202. Blocks that are partially covered by the PIP inset 202 will be visible, and therefore need to be fully decoded. For this reason, it would be advantageous for the PIP inset corners to be aligned with the corners of macroblocks (or alternatively blocks).

The partial decoding of B frames in the covered regions 202 of the primary image will save a number of steps in the decoding process. For example, motion compensation will not need to be performed on these blocks. Motion compensation on a block requires memory accesses to retrieve the pixels in the block from another frame that was used for prediction. It also requires 64 subtractions. In addition, full DCT decoding will not be required which will save a number of additions, multiplications, and memory accesses from being performed. By reducing the processing burden on the MPEG2 video decoder in this way, additional processing can be allocated to the PIP decoding process.

Given moreover, since ⅔ of all frames in typical applications of MPEG2 video encoding are B frames, significant processing savings can be achieved by not decoding the portions of the B frames that are covered by the PIP inset. In fact, for larger PIP insets, more processing power will be freed up for PIP processing.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. An apparatus comprising:
   a digital video processor decompressing a first stream of compressed, digital data representing a first video program into decompressed first video data having a first resolution, the digital video processor outputting a video signal representing a frame of said first video data having a portion overlaid by decompressed second video data having a corresponding second resolution less than the first resolution; and
   an application processor partially decompressing a second stream of compressed, digital data representing a second video program into said second video data;
   wherein the application processor comprises a memory storing software executable by the application processor, the software including a routine for partially decompressing the second data stream into said decompressed second video data at said second resolution.

2. An apparatus comprising:
   a digital video processor decompressing a first stream of compressed, digital data representing a first video program into decompressed first video data having a first resolution, the digital video processor outputting a video signal representing a frame of said first video data having a portion overlaid by decompressed second video data having a corresponding second resolution less than the first resolution;
   an application processor partially decompressing a second stream of compressed, digital data representing a second video program into said second video data; and
   a memory storing executable software, the application processor partially decompressing the second data stream in is response to execution of said software.

3. The apparatus of claim 2, wherein the first and second streams carry MPEG-encoded video data as said respective compressed, digital data.

4. The apparatus of claim 3, wherein the application processor executes one of two-by-two and four-by-four discrete cosine transform (DCT) decoding during said partial decompressing of the second data stream.

5. The apparatus of claim 3, wherein the application processor uses a portion of available discrete cosine transform (DCT) coefficients during said partial decompressing of the second data stream.

6. The apparatus of claim 3, wherein the application processor uses only a DC coefficient from available discrete cosine transform (DCT) coefficients during said partial decompressing of the second data stream.

7. The apparatus of claim 3, wherein the application processor processes only MPEG-encoded I frames from the second data stream.

8. The apparatus of claim 3, wherein the application processor processes only MPEG-encoded I and P frames from the second data stream.

9. An apparatus comprising:
   a digital video processor decompressing a first stream of compressed, digital data representing a first video program into decompressed first video data having a first resolution, the digital video processor outputting a video signal representing a frame of said first video data having a portion overlaid by decompressed second video data having a corresponding second resolution less than the first resolution;
   an application processor partially decompressing a second stream of compressed, digital data representing a second video program into said second video data; and
   a communication interface receiving said first and second streams, the application processor outputting signaling data to the interface, the interface outputting the signaling data for upstream transmission to a digital communications network supplying the first and second streams.

10. An apparatus comprising:
    a digital video processor decompressing a first stream of compressed, digital data representing a first video program into decompressed first video data having a first resolution, the digital video processor outputting a video signal representing a frame of said first video data having a portion overlaid by decompressed second video data having a corresponding second resolution less than the first resolution; and an application processor partially decompressing a second stream of compressed, digital data representing a second video program into said second video data; wherein:

the first and second streams carry MPEG-encoded video data as said respective compressed, digital data and carrying I frames, B frames, and P frames; and the application processor selectively skips at least one of the I frames, B frames, and P frames of said second stream in response to a processing delay time generated during said partial decompressing of the MPEG-encoded video data of said second stream.

11. An apparatus comprising:

a digital video processor decompressing a first stream of compressed, digital data representing a first video program into decompressed first video data having a first resolution, the digital video Processor outputting a video signal representing a frame of said first video data having a portion overlaid by decompressed second video data having a corresponding second resolution less than the first resolution; and an application processor partially decompressing a second stream of compressed, digital data representing a second video program into said second video data; wherein:

the first and second streams carry MPEG-encoded video data having respective identifiers;

the application processor comprises a microprocessor and a MPEG demultiplexer selectively routing the first and second streams to the digital video processor and the microprocessor in response to the respective identifiers; and the digital video processor comprises:

(1) an MPEG decoder decompressing the MPEG-encoded video data from the first stream, and (2) a graphics overlay controller receiving the first and second video data at first and second frame rates, respectively, and in response generating said video signal.

12. An apparatus comprising:

a digital video processor decompressing a first stream of compressed, digital data representing a first video program into decompressed first video data having a first resolution, the digital video processor outputting a video signal representing a frame of said first video data having a portion overlaid by decompressed second video data having a corresponding second resolution less than the first resolution; and an application processor partially decompressing a second stream of compressed, digital data representing a second video program into said second video data; wherein the digital video processor comprises:

a media processor decompressing said first stream of compressed, digital data; and a memory storing code executable by the media processor to control the decompressing of the first stream of compressed, digital data.

13. A digital entertainment terminal comprising:

an MPEG decoder receiving a first stream of MPEG-encoded data representing a first video program and in response outputting first digital video data at a first resolution, the first digital video data representing at least a substantial portion of the first video program;

a microprocessor executing software having a routine for partially decompressing MPEG-encoded data, the microprocessor partially decompressing a second stream of MPEG-encoded data and outputting, at a second resolution less than the first resolution, second digital video data representing a second video program; and a graphics display driver outputting a video signal simultaneously displaying the second video program and at least said portion of the first video program.

14. The terminal of claim 13, wherein the microprocessor executes one of two-by-two and four-by-four discrete cosine transform (DCT) decoding during said partial decompressing of the second stream.

15. The terminal of claim 13, wherein the microprocessor uses a portion of available discrete cosine transform (DCT) coefficients during said partial decompressing of the second stream.

16. The terminal of claim 13, wherein the microprocessor uses only a DC coefficient from available discrete cosine transform (DCT) coefficients during said partial decompressing of the second stream.

17. The terminal of claim 13, wherein the microprocessor processes only I frames from the second stream.

18. The terminal of claim 13, wherein the first resolution is generated in response to outputting the first digital video data at a first frame rate, and the second resolution is generated in response to outputting the second digital video data at a second frame rate less than the first frame rate.

19. The terminal of claim 13, wherein the microprocessor processes only I and P frames from the second stream.

20. A method of generating a video signal of first and second video programs, comprising:

receiving first and second MPEG-encoded streams carrying the first and second video programs, respectively;

decoding at least a substantial portion of the first MPEG-encoded stream in an MPEG decoder and outputting decompressed, first digital data carrying the first video program;

partially decoding the second MPEG-encoded stream and generating second digital data carrying a limited-resolution representation of the second video program;

combining the first and second digital data in a video memory; and outputting from the video memory the video signal carrying a frame of the combined data.

21. The method of claim 20, wherein the step of partially decoding the second MPEG-encoded stream and generating second digital data comprises:

determining an idle interval in operation of said MPEG decoder between decompression of frames from said first MPEG-encoded stream; and outputting from said MPEG decoder said second digital data from the second MPEG-encoded stream during said idle interval.

22. The method of claim 20, wherein the step of partially decoding the second MPEG-encoded stream and generating second digital data comprises:

supplying the second MPEG-encoded stream to a microprocessor;

executing in said microprocessor the partial decoding of the second MPEG-encoded stream; and outputting the second digital data from the microprocessor.

23. The method of claim 20, wherein the step of decoding at least a substantial portion of the first MPEG-encoded stream comprises partially decoding a second portion of the first MPEG-encoded stream corresponding to a region of the first video program to be covered by said second video program.

24. An apparatus comprising:
- a digital video processor receiving a first stream of compressed, digital data representing a first video program and decompressing the compressed, digital data into decompressed first video data having a first resolution, the digital video processor outputting a video signal representing a frame of at least a portion of said first video data and decompressed second video data having a corresponding second resolution less than the first resolution; and
- a microprocessor receiving a second stream of compressed, digital data representing a second video program and partially decompressing the corresponding compressed, digital data into said decompressed second video data.

25. The apparatus of claim 24, wherein the digital video processor comprises:
- a digital video decoder decompressing the compressed, digital data from the first stream into said first video data; and
- a video overlay controller combining the first and second decompressed video data into said video signal.

26. The apparatus of claim 25, wherein the digital video decoder comprises an MPEG decoder and the micro processor executes MPEG processing on said second stream and in response outputting said second video data.

27. The apparatus of claim 26, further comprising a network interface receiving the first and second streams from a digital communications network and supplying the received first and second streams to the MPEG de coder and the microprocessor, respectively.

28. The apparatus of claim 24, wherein the digital video processor comprises:
- a media processor decompressing the first stream of compressed, digital data; and
- a memory storing code executable by the media processor to control the decompressing of the first stream of compressed, digital data.

29. A digital entertainment terminal comprising:
- an application processor receiving multiplexed digital data carrying first and second streams of compressed, digital data representing first and second programs, respectively, the first and second streams having first and second identifiers, respectively, the application processor outputting the first stream of compressed digital data and a portion of the second stream of compressed, digital data in response to the respective first and second identifiers; and
- a media processor decompressing at least the first stream into first decompressed video data representing said first program, the media processor combining said first decompressed video data with second decompressed video data generated from said portion of the second stream and outputting the combined first and second video data as a video signal representing a video frame simultaneously displaying at least portions of said first and second video programs;
- wherein said portion of the second stream is partially decompressed into said second decompressed video data by one of said application processor and said media processor.

30. The terminal of claim 29, further comprising a buffer memory receiving from the application processor and storing the first stream and said portion of the second stream received from the media processor.

31. The terminal of claim 29, wherein said application processor comprises a demultiplexer demultiplexing said multiplexed digital data into said first and second streams of compressed, digital data in response to the respective first and second identifiers.

32. The terminal of claim 31, wherein the application processor further comprises:
- a microprocessor partially decompressing said portion of the second stream into said second decompressed video data in response to execution of decompression software; and
- a memory accessible by the microprocessor and storing the decompression software.

33. The terminal of claim 32, wherein said microprocessor executes one of two-by-two and four-by-four discrete cosine transform (DCT) decoding during said partial decompressing of the portion of the second stream.

34. The terminal of claim 32, wherein the microprocessor uses a portion of available discrete cosine transform (DCT) coefficients during said partial decompressing of the portion of the second stream.

35. The terminal of claim 32, wherein the microprocessor uses only a DC coefficient from available discrete cosine transform (DCT) coefficients during said partial decompressing of the portion of the second stream.

36. The terminal of claim 29, wherein the portion of the second stream includes only MPEG-encoded I frames of said second video program.

37. The terminal of claim 29, wherein the portion of the second stream includes only MPEG-encoded I and P frames of the second video program.

38. The terminal of claim 29, wherein the media processor partially decompresses a frame from said portion of the second stream between the decompression of two adjacent frames from said first stream.

39. The terminal of claim 38, wherein the portion of the second stream includes only MPEG-encoded I frames of said second video program.

40. The terminal of claim 38, wherein the portion of the second stream includes only MPEG-encoded I and P frames of the second video program.

41. The terminal of claim 29, wherein the first decompressed video data has a first resolution and the second decompressed video data has a second resolution, less than the first resolution, determined in response to a frame rate of the second decompressed video data.

42. An apparatus comprising:
- an MPEG decoder decompressing a first stream of compressed, digital data into first decompressed video data having a first resolution and partially decompressing a second stream of compressed, digital data into second decompressed video data having a second resolution less than the first resolution, the first and second decompressed video data representing first and second video programs, respectively; and
- an overlay controller receiving the first and second decompressed video data and in response outputting a video frame signal simultaneously displaying at least portions of the first and second video programs.

43. The apparatus of claim 42, further comprising a filter receiving an MPEG-encoded data stream including I, B, and P frames of said second video programs, the filter removing at least the B frames from said MPEG-encoded data stream and in response outputting said second stream of compressed, digital data.

44. The apparatus of claim 43, wherein said filter removes the B and P frames from said MPEG-encoded data stream and in response outputs said second stream of compressed, digital data.

45. The terminal of claim 42, wherein the MPEG decoder decompresses a frame from the second stream between the decompression of two adjacent frames from said first stream.

46. An apparatus comprising:
- an application processor receiving multiplexed digital data carrying first and second streams of MPEG-encoded digital data representing first and second programs, respectively, the first and second streams having first and second identifiers, respectively, the application processor outputting the first stream of MPEG-encoded digital data and a portion of the second stream of MPEG-encoded digital data in response to the respective first and second identifiers; and
- an MPEG decoder decompressing at least the first stream into first decompressed video data representing said first program, the portion of the second stream being partially decompressed into a second decompressed video data by one of said MPEG decoder and said application processor.

47. The apparatus of claim 46, further comprising an overlay controller receiving the first and second video data and in response outputting a video frame signal simultaneously displaying at least portions of the first and second video programs.

48. The apparatus of claim 46, wherein the MPEG decoder partially decompresses a portion of said first stream corresponding to a region of said first program to be covered by said second program.

* * * * *